(12) United States Patent
Giraud

(10) Patent No.: US 6,499,523 B1
(45) Date of Patent: Dec. 31, 2002

(54) TIRE WITH CROWN REINFORCEMENT INCLUDING HALF-PLIES

(75) Inventor: Jacques Giraud, Beaumont (FR)

(73) Assignee: Compagnie Generale des Etabliesements Michelln-Michelln & Cie, Clermont-Ferrend (FR)

( * ) Notice: Subject to any disclaimer, the term of this patent is extended or adjusted under 35 U.S.C. 154(b) by 130 days.

(21) Appl. No.: 09/639,564

(22) Filed: Aug. 16, 2000

Related U.S. Application Data

(63) Continuation of application No. PCT/EP99/00908, filed on Feb. 12, 1999.

(30) Foreign Application Priority Data

Feb. 20, 1998 (FR) .............................. 98 02172

(51) Int. Cl.$^7$ .............................. B60C 9/18; B60C 9/20
(52) U.S. Cl. .................... 152/534; 152/526; 152/535
(58) Field of Search ................. 152/526, 534, 152/535

(56) References Cited

U.S. PATENT DOCUMENTS 4,271,890 A    6/1981   Pommier

| 4,498,514 A | 2/1985 | Maathuis et al. |
| 4,669,520 A | 6/1987 | Koseki et al. |
| 4,934,429 A | 6/1990 | Koseki et al. |

FOREIGN PATENT DOCUMENTS

| EP | 0416893 | 3/1991 |
| FR | 2419185 | 10/1979 |

*Primary Examiner*—Adrienne C. Johnstone
(74) *Attorney, Agent, or Firm*—Baker Botts L.L.P.

(57) ABSTRACT

A tire having a form ratio under 0.80, a metallic radial carcass reinforcement, and a working crown reinforcement of two working plies formed of non-extensible reinforcement elements oriented at angles $\alpha$ and $\alpha'$, with axial widths in the ranges between $0.65S_o$ to $0.80S_o$ and $0.35S_o$ to $0.45S_o$, $S_o$ being the maximum axial width of the median line of the carcass reinforcement, and two half-plies of non-extensible metallic elements making an angle $\beta$ with the circumferential direction, where $\beta$ is less than angles $\alpha$, $\alpha'$ by at least 2°, and is opposite to angle $\alpha$ of the widest axially continuous working ply, the half-plies located on either side of the equatorial plane XX' having axial widths between $0.22S_o$ and $0.35S_o$, and axially inside edges separated from the equatorial plane XX' by a distance equal to half the width of the narrower working ply less an amount of at least $0.05S_o$.

5 Claims, 2 Drawing Sheets

TIRE WITH CROWN REINFORCEMENT INCLUDING HALF-PLIES

This is a continuation of PCT/EP99/00908, filed Feb. 12, 1999.

BACKGROUND OF THE INVENTION

The invention concerns a tire whose form ratio H/S is at most equal to 0.80, and more particularly a tire of the "heavy-duty" or "civil engineering" type.

A tire of this kind, which is generally designed to support heavy loads, comprises a radial carcass ply and a crown reinforcement consisting of at least two working crown plies formed of non-extensible reinforcement elements, crossed over from one ply to the next and making with the circumferential direction angles which may be equal or unequal, but which generally range between 10° and 45°.

When the axial width S of such tires is increased without increasing their equatorial and rim seat diameters, i.e. if the height H of the tire on its rim is kept the same, it is found that the contact area on horizontal flat ground changes shape considerably for H/S ratios smaller than 0.65, and this despite the use of a working crown reinforcement that resists the stresses applied to it.

The contact area becomes axially wider but shorter in the longitudinal direction of the tire. This shortening in the longitudinal direction involves an increasingly pronounced retraction in the equatorial zone, to the point when the front and back edges of the contact area may come together, and the said area is then divided into two areas symmetrical with respect to the longitudinal axis of the tread.

Notwithstanding the advantages of wide treads and H/S form ratios smaller than unity, especially in touring vehicles, the unusual shape of the contact area of a tire with form ratio smaller than 0.80 has many disadvantages in the case of tires for heavy vehicles, owing to irregularity in the axial direction of the radial deformations of the carcass reinforcement/working crown reinforcement combination under the action of the stresses due to the inflation pressure.

The said disadvantages are of many kinds, and concern both the durability of the reinforcement armature and the resistance of the tread and the tire to soil aggression (wear, degradation, puncture, impacts, etc.).

To remedy the shortening of the contact area in the longitudinal direction and the resulting lack of durability of the crown reinforcement, patent FR 2 419 185 recommends positioning between the carcass reinforcement and the radially innermost working crown ply, and in two distinct areas of the equatorial plane, two limiting blocks each of which consists of two superimposed plies of non-extensible cables, crossed over from one ply to the next and making opposite angles with the circumferential direction, the absolute value of the said angles being half of the smallest angle used in the working plies and differing by 0°. Though the solution recommended in the said patent also improves the endurance of the tire since the resistance to separation between the working plies at their edges is increased, while the plies of the limiting blocks are not subjected to the said separation, in contrast it results in excessive fretting which brings the risk that the cables of the working plies may undergo compression when the tire is flattened.

To improve the wear of tires with low H/S values as well as their resistance to crown ply separation, U.S. Pat. No. 4,934,429 claims in contrast to the above that metallic cables can be used, which are extensible and whose orientation relative to the circumferential direction may be zero, the said cables forming part of an additional armature consisting of at least one ply in two portions, one on either side of the equatorial plane, the extensibility of the said cables being chosen as a function of the extension modulus desired respectively for the reinforcement ply or plies and for the crown plies.

The presence of additional armatures of circumferential reinforcement elements or ones very slightly inclined relative to the circumferential direction does not seem to be the best solution to give axial uniformity of the rigidities of the crown reinforcement and at the same time the contact pressures with the ground and/or the slippage between the tread and the ground.

SUMMARY OF THE INVENTION

The present invention proposes a different solution for achieving the above uniformity, a solution relating to the constitution and structure of the working crown reinforcement.

The tire according to this invention has a form ratio H/S smaller than 0.80 and comprises a radial carcass reinforcement consisting of at least one ply of non-extensible metallic reinforcement elements. This is covered radially by a working crown reinforcement consisting of at least two working crown plies which are axially continuous and are formed of non-extensible metallic reinforcement elements parallel to one another within each ply and crossed over from one ply to the next, so as to make with the circumferential direction angles $\alpha$ and $\alpha'$ between 10° and 45°. The tire is characterized in that the two working plies have axial widths respectively within the ranges $0.65 S_O$ to $0.80 S_O$ and $0.35 S_O$ to $0.45 S_O$ where $S_O$ is the maximum axial width of the median line of the carcass reinforcement. The working crown reinforcement is completed by the presence of two half-plies consisting of non-extensible metallic elements which, relative to the circumferential direction, make an angle $\beta$ smaller than the lesser of the two angles $\alpha$ and $\alpha'$ by at least 2°, the direction of $\beta$ being opposite to the direction of the angle $\alpha$ of the widest axially continuous working ply. The said half-plies are positioned on either side of the equatorial plane and have axial widths between $0.22 S_O$ and $0.35 S_O$, such that their axially inteal edges are separated from the equatorial plane by a distance equal to half the width of the narrower working ply, less an amount at least equal to $0.05 S_O$.

It is preferable for the two axially continuous plies formed of elements oriented at angles $\alpha$ and $\alpha'$ to be radially closest to the carcass reinforcement and, in this context, the less wide ply is preferably the one closest to the radially outermost ply of the carcass reinforcement, the said less wide ply having reinforcement elements oriented at an angle said to be $-\alpha'$ or to the left.

It is advantageous to add, radially outside the working reinforcement defined above and comprising two axially continuous plies of reinforcement elements and two first half-plies, a further two half-plies of non-extensible metallic elements parallel to one another within each half-ply and crossed over with the elements of the two radially lower half-plies making an angle $\gamma$ with the circumferential direction, the angle $\gamma$ being on the one hand larger than the largest of the angles $\alpha$ and $\alpha'$ of the axially continuous plies and on the other hand also larger than the angle $\beta$ of the reinforcing elements of the first two half-plies by at least 10°.

The axially inside ends of the said two half-plies of elements oriented with the said angle y are separated from the equatorial plane by a distance equal to half the width of the widest axially continuous working ply, less an amount at least equal to $0.05S_O$.

The axially outer edges of the said half-plies of elements oriented at angle γ may be positioned axially outside the axially outer edges of the two half-plies oriented at angle β, but it is preferable for them to be separated from the equatorial plane by a distance at most equal to the distance between the axially outer edges of the plies oriented at angle β from the said plane.

The characteristics of the invention will be better understood from the description below, which refers to the drawing illustrating examples of embodiments in a non-limiting way.

DESCRIPTION OF PREFERRED EMBODIMENTS

Figure 1:
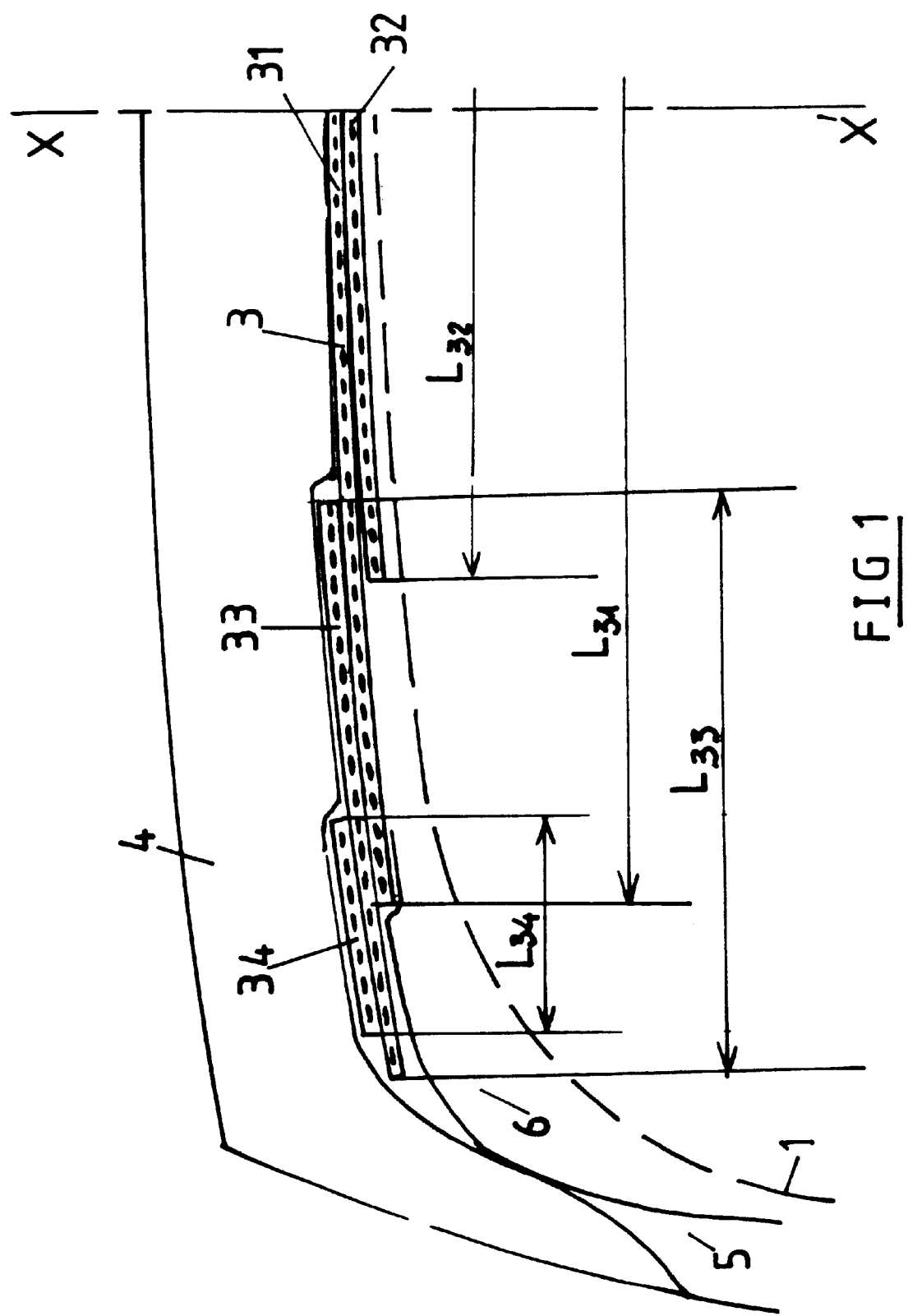
FIG. 1 is a schematic meridian section of a crown reinforcement according to the invention.

The tire (FIG. 1) is one with a form ratio H/S equal to 0.5, where H is the height of the tire on its rim and S is its maximum axial width when fitted to its working rim and inflated to the recommended pressure.

The tire comprises a radial carcass reinforcement composed of a ply 1 of non-extensible metal cables anchored in each bead to at least one bead wire (not shown). The ply 1 is covered radially on its outside by a working crown reinforcement 3 and by one or more protective plies (not shown). The working reinforcement comprises in the first place two axially continuous working plies 31 and 32 of width $L_{31}$ and $L_{32}$, the less wide of which 32 being, in the case described, closest to the carcass reinforcement 1. The widths $L_{31}$ and $L_{32}$ are respectively equal to $0.72S_O$ and $0.42S_O$. The said two plies 31 and 32 are formed of non-extensible metallic elements which lie parallel to one another within each ply and cross over from one ply to the next, making with respect to the circumferential direction of the tire an angle of 22°. Radially on the outside, at the edges of the wider ply 31, are positioned two half-plies 33 formed of the same non-extensible metallic elements as those forming the plies 31 and 32, the said elements being mutually parallel within each half-ply and crossed with the elements of the widest axially continuous ply 31 so as to make an angle β relative to the circumferential direction, where β is smaller than a and equal to 18°. The axial width $L_{33}$ of each half-ply 33 is equal to $0.29S_O$ and the axially inside edge of the half-ply 33 is located at an axial distance from the equatorial plane XX' such that there is an overlap between the axially inside edge of the said half-ply 33 and the axially outer edge of the second, less wide and radially innermost axially continuous ply 32, with the edge of the half-ply 33 radially on top of the edge of the said continuous ply 32, the width of the said overlap being $0.06S_O$.

The working reinforcement 3 is completed by two further half-plies 34. These are positioned radially outside the first two half-plies 33 and are formed of the same cables as those of the plies 31, 32, 33 already present, the said cables being mutually parallel within each half-ply 34 and crossed with the cables of the radially adjacent first half-ply 33, forming an angle of 34° relative to the circumferential direction. The axially inside edge of a second half-ply 34 is separated from the equatorial plane XX' by a distance equal to $0.30S_O$, giving an overlap of $0.06S_O$ with the axially outer edge of the widest axially continuous ply 31. The axially outer edge of each second half-ply 34 is separated from the equatorial plane by a distance at most equal to the distance between the axially outer edge of each first half-ply 33 and the said plane, and in the case considered, the outer edge of the half-ply 34 is axially inside the edge of the first half-ply 33 by a distance $0.01S_O$. The axial width of each second half-ply 34 is thus $0.125S_O$.

Proceeding from the equatorial plane XX' towards the axially outer edge of the working reinforcement 3, which in the case described is the axially outer edge of the first half-ply 33, the crown reinforcement 3 can be divided into several zones:

a) a first zone, from the equatorial plane as far as the axially inside edge of the first half-ply 33, having axial width equal to $0.145S_O$ with two plies of reinforcement elements crossed (−22°, +22°) from one ply 32 to the next 31, b) a second zone, from the axially inside edge of the half-ply 33 to the axially outer edge of the narrower axially continuous ply 32, with an axial width of $0.06S_O$ and having three reinforcement element plies with angular configuration (−22°, +22°, −18°), c) a third zone, from the axially outer edge of the less wide axially continuous ply 32 to the axially inside edge of the second half-ply 34, with two plies of reinforcement elements having the configuration (+22°, −18°) and with a width equal to $0.095S_O$, d) a fourth zone, from the axially inside edge of the second half-ply 34 to the axially outer edge of the widest axially continuous ply 31, having a width equal to $0.06S_O$, and with three plies of reinforcement elements having angular configuration (+22°, −18°, +34°), e) a fifth zone, from the axially outer edge of the widest axially continuous ply 31 to the axially outer edge of the second half-ply 34, with a width of $0.065S_O$ in the case described and having reinforcement elements with angular configuration (−18°, +34°), f) and finally a sixth zone, containing only the axially outer edge of the first half-ply 33 of width $0.01S_O$.

Figure 2:
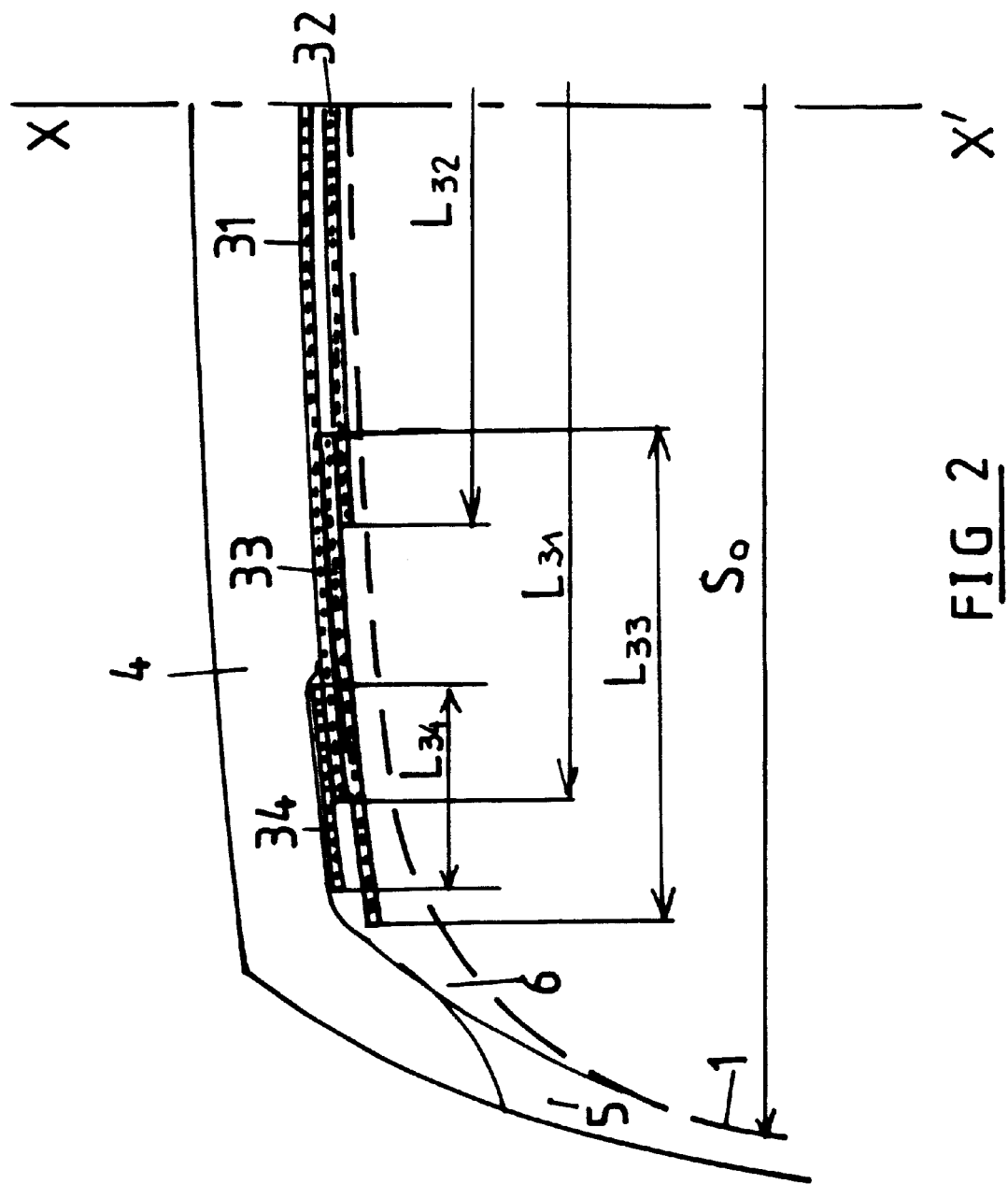
FIG. 2 is a schematic meridian section of a variant crown reinforcement, again according to the invention.

FIG. 2 shows a variant of the crown reinforcement 3 according to the invention. The said reinforcement differs from the previous one shown in FIG. 1, only in the radial arrangement of the working plies and half-plies, together with the modifications of values and angular orientation required to give the same rigidity zones as before.

Thus, the narrower axially continuous ply 32 is still the working ply closest to the carcass reinforcement 1 and its reinforcement elements are oriented at an angle −20°. At the edges of the said ply 32 are arranged the first half-plies 33, the axially inside edge of each half-ply 33 being at a distance from the equatorial plane XX' such that there is an overlap with the axially outer edge of the narrower axially continuous ply 32 closest to the carcass reinforcement, the said overlap being $0.06S_O$ wide. Radially above the half-plies 33 is positioned directly the wider axially continuous ply 31 whose reinforcement elements have orientation +20°. The reinforcement elements of each half-ply 33 are crossed with those of the axially wider continuous ply 31, and are oriented in the same direction as the elements of the narrower ply 32, making an angle of −18° relative to the circumferential direction. In the same way as before, two half-plies 34 complete the working crown reinforcement 3, the reinforcement elements of the said plies being oriented at +34° and so lying across the elements of the half-plies 33.

The axial widths of the working plies of the second example embodiment described are the same as the widths in the example shown in FIG. 1. The same applies to the widths of the circumferential zones with different rigidities described in the first example. Thus, the widths of the two axially continuous plies 31 and 32, namely $L_{31}$ and $L_{32}$, are respectively equal to $0.72S_O$ and $0.41S_O$, and the widths of the two pairs of half-plies are equal to $0.29S_O$ and $0.125S_O$. The widths of the zones defined earlier are still $0.145S_O$, $0.06S_O$, $0.095S_O$, $0.06S_O$, $0065S_O$, $0.065S_O$ and $0.01S_O$.

Whatever the structure of the working reinforcement used, the said reinforcement 3 is completed radially on the outside, and in a manner known in its own right, by a protection reinforcement which may consist either of at least one ply and preferably at least two plies of so-termed elastic metallic reinforcement elements, as known in their own right, or of a coil of undulating or zig-zagging metallic steel elements in at least one layer.

Finally, the tire is completed in a manner known in its own right by a tread 4 and sidewalls 5, while the carcass reinforcement 1 is separated from the edges of the crown reinforcement 3 by rubber-mix sections 6 of essentially triangular shape, and with the edges of the working plies of the said crown reinforcement 3 separated from one another either by triangular rubber sections or by edging strips of flat rubber.

Tires of the types described and illustrated in FIGS. 1 and 2 have been compared with a control tire of the same size with a conventional working crown reinforcement, i.e. one made of two axially continuous working plies whose widths are very close to the distances between the axially outer ends of the plies 33 and 34 in the two tires tested.

From the endurance rolling tests under drift carried out (rolling tests on civil engineering dumpers fitted with the same tires front and back and on a site track with numerous bends), it emerged that the solutions proposed and described clearly improve the resistance of the crown reinforcement to mechanical degradation by separation between the plies. The control tire lasted on average for 250 h of rolling (front-back average) while the test tires lasted for an average of 720 h, with some advantage in favor of the tire corresponding to FIG. 1 and the description pertaining thereto, as judged in terms of visual assessment of the damage that had occurred. The said improvement was obtained with no loss of performance relative to puncture of the crown reinforcement by an aggressive object, and without any deterioration of the vehicle's behavior on the track.

I claim:

1. A tire with a form ratio smaller than 0.80, comprising a radial carcass reinforcement consisting of at least one ply of non-extensible metallic reinforcement elements, and covered radially by a working crown reinforcement consisting of at least two working crown plies which are axially continuous and are formed of non-extensible metallic reinforcement elements parallel to one another within each ply and crossed over from one ply to the next such that they make angles $\alpha$, $\alpha'$ relative to the circumferential direction between 10° and 45°, the tire characterized in that the two working plies have axial widths, respectively, in the ranges $0.65S_O$ to $0.80S_O$ and $0.35S_O$ to $0.45S_O$, $S_O$ being the maximum axial width of the median line of the carcass reinforcement, the working crown reinforcement being completed by the presence of at least two half-plies of non-extensible metallic elements which make an angle $\beta$ relative to the circumferential direction, $\beta$ being smaller than the angles $\alpha$ and $\alpha'$, by at least 2°, and in the direction opposite to that of the angle $\alpha$ of the widest axially continuous working ply, the said half-plies being positioned on either side of the equatorial plane XX' with axial widths between $0.22S_O$ and $0.35S_O$, such that their axially inside edges are separated from the equatorial plane XX' by a distance equal to half the width of the narrower working ply less an amount at least equal to $0.05S_O$.

2. A tire according to claim 1, characterized in that the two axially continuous plies formed of elements oriented at angles $\alpha$ and $\alpha'$ are radially closest to the carcass reinforcement, the narrower ply being closest to the radially outermost ply of the carcass reinforcement and the said narrower ply having reinforcement elements oriented at an angle $-\alpha'$.

3. A tire according to claim 1, characterized in that the working reinforcement is completed, radially outside the first two half-plies, by two other half-plies of non-extensible metallic elements mutually parallel within each half-ply and crossed with respect to the elements of the two half-plies radially underneath them, which make an angle $\gamma$ relative to the circumferential direction such that $\gamma$ is on the one hand larger than the largest of the angles $\alpha$ and $\alpha'$ of the axially continuous plies and on the other hand also larger than the angle $\beta$ of the reinforcement elements of the first two half-plies by at least 10°.

4. A tire according to claim 3, characterized in that the axially inside edges of the said half-plies of elements oriented at the said angle $\gamma$ are separated from the equatorial plane XX' by a distance equal to half the width of the widest axially continuous working ply less an amount at least equal to $0.05S_O$.

5. A tire according to claim 4, characterized in that the axially outer edges of the said half-plies of elements oriented at the angle $\gamma$ are separated from the equatorial plane by a distance at most equal to the distance separating the axially outer edges of the half-plies of elements at angle $\beta$ from the said plane.

* * * * *

UNITED STATES PATENT AND TRADEMARK OFFICE
CERTIFICATE OF CORRECTION

PATENT NO. : 6,499,523 B1
DATED : December 31, 2002
INVENTOR(S) : Giraud

It is certified that error appears in the above-identified patent and that said Letters Patent is hereby corrected as shown below:

<u>Title page,</u>
Item [73], Assignee, "Generale" should read -- Générale --;
"Etabliesements" should read -- Etablissements --; "Michelln" (both occurrences) should read -- Michelin --; and "Clermont-Ferrend" should read -- Clermont-Ferrand --

<u>Column 2,</u>
Line 42, "inteal" should read -- internal --

<u>Column 3,</u>
Line 50, "a" should read -- α --

<u>Column 5,</u>
Line 10, "0065S$_O$" should read -- 0.065S$_O$ --

Signed and Sealed this

Sixteenth Day of September, 2003

JAMES E. ROGAN
*Director of the United States Patent and Trademark Office*